United States Patent [19]

Yamada et al.

[11] Patent Number: 4,506,545
[45] Date of Patent: Mar. 26, 1985

[54] SENSOR FOR DETECTING FLOW QUANTITY OF FUEL SUPPLIED TO FUEL INJECTION SYSTEM

[75] Inventors: Masatoshi Yamada; Eiichi Yasuda; Masanobu Kimura, all of Aichi; Tatehito Ueda; Eiji Hashimoto, both of Shizuoka, all of Japan

[73] Assignee: Kabushiki Kaisha Toyota Chuo Kenkyusho and Toyota Jidosha Kogyo Kabushiki Kaisha, Aichi, Japan

[21] Appl. No.: 379,436

[22] Filed: May 18, 1982

[30] Foreign Application Priority Data

May 20, 1981 [JP] Japan .................. 56-71844[U]

[51] Int. Cl.³ .................... G01M 15/00; F02M 39/00
[52] U.S. Cl. .................... 73/119 A; 123/494; 123/503
[58] Field of Search .......... 73/119 A; 123/494, 449, 123/503, 357; 324/207, 225; 336/179

[56] References Cited

U.S. PATENT DOCUMENTS

| | | | |
|---|---|---|---|
| 3,344,663 | 10/1967 | Dreisin et al. | 73/119 A |
| 4,036,193 | 7/1977 | Kobayashi et al. | 123/357 |
| 4,123,729 | 10/1978 | Buetemeister | 123/494 |
| 4,208,918 | 6/1980 | Miyamae | 73/708 |
| 4,211,203 | 7/1980 | Kobayashi | 123/449 |
| 4,411,242 | 10/1983 | Igashira et al. | 123/571 |

FOREIGN PATENT DOCUMENTS 55-5423  1/1980  Japan .................. 123/449

Primary Examiner—Jerry W. Myracle
Assistant Examiner—John E. Chapman, Jr.

[57] ABSTRACT

Disclosed is a sensor for detecting flow quantity of fuel supplied to a fuel injection system based on an idea that the flow quantity of fuel supplied to a fuel injection system is detected by means of detection of a displacement of a spill-ring. This sensor is provided with a detection member connected with a spill-ring of a fuel injection system, a coil assembly consisting of a coil for detecting the displacement of the spill-ring which is fitted to one end of a bobbin which is arranged to face with the detection member but not to contact the detection member, the one end of the bobbin being arranged to face with the detection member, and a coil for temperature compensation, the two coils being arranged side by side along the bobbin with a predetermined space therebetween, and a member for holding the coil assembly and for fitting the coil assembly to the fuel injection system.

7 Claims, 9 Drawing Figures ded on the bobbin, the two coils being arranged side by side along the bobbin with a predetermined space separating the two coils from each other, and (c) a member for holding the coil assembly and for fitting the coil assembly to the fuel injection system, whereby the flow quantity of fuel which is supplied to the fuel injection system is detected by means of detection of the displacement of the spill-ring.

The above and other objects, advantages and features of the present invention will become more apparent from the following description of a preferred embodiment thereof presented in conjunction with the accompanying drawings.

SENSOR FOR DETECTING FLOW QUANTITY OF FUEL SUPPLIED TO FUEL INJECTION SYSTEM

BACKGROUND OF THE INVENTION

1. Field of the Invention

The present invention relates to equipment which is employed for detecting the flow quantity and, more particularly, to a sensor for detecting the flow quantity of fuel supplied to a fuel injection system. As conventionally used in this art, the "flow quantity" of fuel is the amount of fuel supplied to the cylinder of an engine per stroke of a plunger of an injection pump.

2. Statement of the Prior Art

Various efforts have been made to develop systems used for regulation of internal combustion engines, particularly for electronic regulation systems applicable to regulation of internal combustion engines for the ultimate purposes of making the exhaust gas of such engines cleaner and improving the combustion efficiency of such engines. For the foregoing purposes, such systems as described above absolutely require various types of detectors or sensors including a sensor which is applicable to continuous detection or measurement of the quantity of fuel which is injected to an internal combustion engine.

Various types of sensors for measurement of the flow quantity of fuel and which can be mounted on an automobile have been developed and are available in the prior art. Among the flow meters available in the prior art, a turbine type flow meter is recognized as most excellent from the realistic viewpoints. Unfortunately, however, the turbine type flow meter is accompanied by drawbacks including (1) a rather large external dimension thereof, (2) a limitation concerning the means to arrange the meter inside an automobile, and (3) a limitation for the minimum flow quantity for which the measurement is allowed. As a result, it is determined that a turbine type flow meter available in the prior art is not necessarily appropriate for application particularly to small sized automobiles.

OBJECTS AND STATEMENT OF THE INVENTION

An object of the present invention is to provide a small and light sensor for detecting the flow quantity of fuel supplied to a fuel injection system, wherein the improvement is made (1) to decrease the external dimension thereof and the weight thereof, (2) to enable the sensor to be assembled with a fuel injection system in one body, (3) to simplify the configuration thereof and (4) to decrease the production cost thereof.

Another object of the present invention is to provide a sensor for detecting the flow quantity of fuel supplied to a fuel injection system, the sensor being subjected to temperature compensation so that the sensor is applicable to detection of the flow quantity in a relatively wide temperature range.

To achieve the foregoing objects, a sensor for detecting the flow quantity of fuel supplied to a fuel injection system in accordance with the present invention is provided with (a) a detection member connected to a spill-ring of the fuel injection system, (b) a coil assembly a bobbin arranged to face the detection member in a not to contact the detection member comprising a first coil for detecting a displacement of the spill-ring, provided on an end portion the bobbin nearer to the detection member, and a second coil for temperature compensa-

DETAILED DESCRIPTION

A distribution type fuel injection system which is commonly employed for small sized automobiles regulates the quantity of fuel i.e. the amount of fuel injected per stroke of the plunger of a fuel injector which is supplied to an engine, following the position of a spill-ring.

Figure 1:
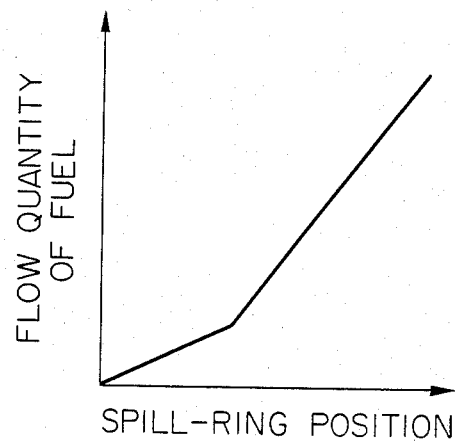
FIG. 1 is a graph showing the relations between the position of a spill-ring and the flow quantity of fuel supplied to a fuel injection system.

The relation shown in FIG. 1 is recognized between the fuel quantity and the position of a spill-ring. Therefore, it is possible to determine the flow quantity of fuel by measurement of the position of the spill-ring, based on the relation shown in the graph of FIG. 1.

For the purpose of determining the displacement of a spill-ring which represents a flow quantity of fuel, it is possible to detect the displacement of a component of the link mechanism which adjusts the position of a the spill-ring rather than directly detecting the displacement of the spill-ring itself. However, the detection of the position of the spill-ring itself is best, because adverse effects of play and/or hysteresis of the link mechanism can be avoided from occuring in the case of indirect detection. The requirements for a detector based on this idea are that (a) the detector is hardly influenced by the pressure and the temperature of fuel flowing in a pump, in view of the specific construction of a fuel injection system wherein a spill-ring is located in an injection pump, (b) the detector is small in size, (c) the detector has the high sensitivity, in view of a small amount of displacement to be made by the spill-ring, etc. It is needless to emphasize that high reliability and durability and a lower price are important parameters from realistic viewpoints.

The present invention is a combined achievement of study conducted to satisfy the various aspects of the above presented requirements. A detailed description will be presented below for a sensor for detecting flow quantity of fuel supplied to fuel injection system in accordance with the present invention, referring to the drawings.

Figure 2:
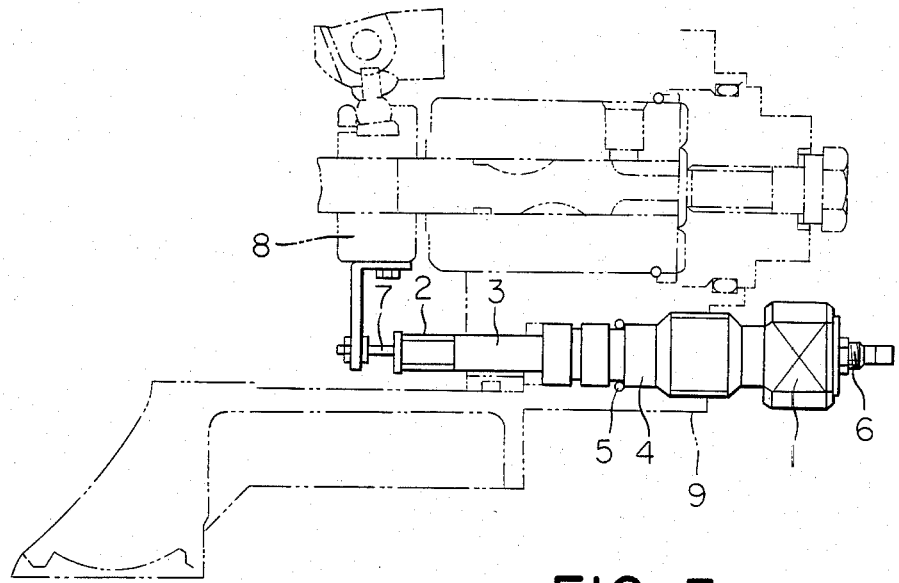
FIG. 2 is a schematic side view of a sensor for detecting the flow quantity of fuel supplied to the fuel injection system in accordance with one preferred embodiment of the present invention.

FIG. 2 shows a basic configuration of a sensor for detecting flow quantity of fuel supplied to a fuel injection system in accordance with one embodiment of the present invention. Referring to FIG. 2, a sensor 1 for detecting the flow quantity of fuel supplied to fuel injection system shown by solid lines is connected to a distribution type fuel injection system shown by two-dotted chain lines. This sensor 1 for detecting the flow quantity of fuel is provided with a coil 2, a coil bobbin 3, a pump-fixing member 4 coupled with the coil bobbin 3 in one body, a seal 5 attached to the pump-fixing member 4, an output terminal 6 and a detection rod 7 which is fixed to a spill-ring 8.

Figure 3:
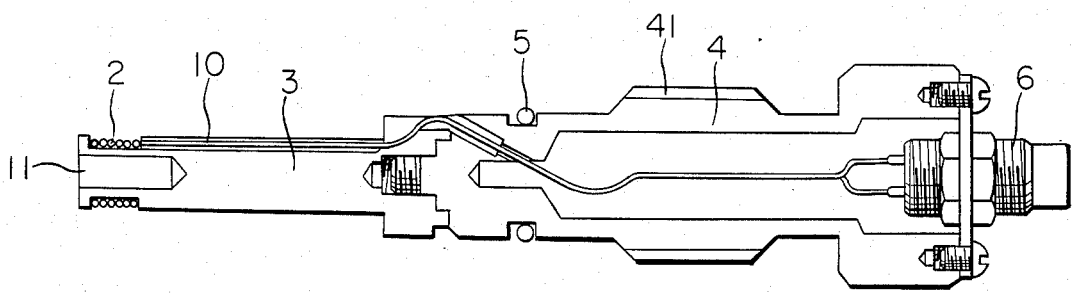
FIG. 3 is a cross sectional view of the sensor shown in FIG. 2.

FIG. 3 is a cross sectional view of the sensor for detecting flow quantity of fuel supplied to fuel injection system shown in FIG. 2. The coil bobbin 3 and the pump-fixing member 4 are coupled with each other by means of a screw. Threads 41 are provided along the external surface of the pump-fixing member 4. Therefore, the pump-fixing member 4 can be screwed into a pump casing 9. Further, it is readily possible to adjust the relative relations between the reference position of the spill-ring 8 and the sensor 1. A lead wire 10 passes through a groove provided along the external surface of the coil bobbin 3, a penetration hole provided at one end of the pump-fixing member 4 and the internal hollow space provided in the pump-fixing member 4, before it arrives at the output terminal 6. The penetration hole is closed by means of insulating adhesive, so that the leakage of fuel therethrough is prohibited, inspite of a rather high internal pressure of a pump housing. A cylindrical hollow space 11 is provided along the axis of the coil bobbin 3 on which the coil 2 is wound at an end portion thereof which corresponds to the hollow space 11. The detection rod 7 is inserted into the cylindrical hollow space 11 in a condition in which the detection rod 7 does not contact the coil bobbin 3.

The positional relationship between the coil 2 and the detection rod 7 changes with the change of the position of the spill-ring, resulting in the change of inductance of the coil 2.

Figure 4:
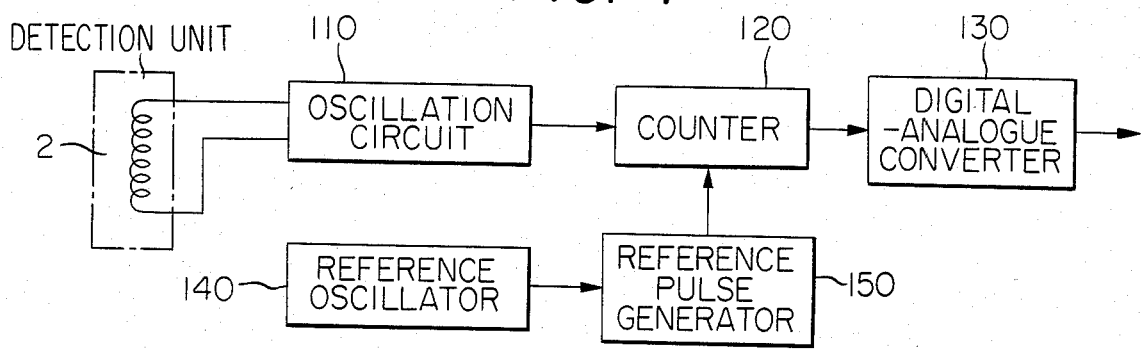
FIG. 4 is a block-diagram of a circuit which is connected to the sensor shown in FIG. 3.

FIG. 4 shows a block diagram of apparatus which detects an electric signal representing a displacement of the spill-ring, which signal is picked up employing the coil 2 shown in FIG. 3. Referring to FIG. 4, the signal detection circuit is provided with an oscillation circuit 110 which varies the oscillation frequency thereof in response to a variation in inductance of the coil 2, a counter 120 which counts the output frequency of the oscillation circuit 110, a reference oscillator 140 for the counter 120, a reference pulse generator 150 which generates and supplies reference pulses to the counter 120, and a digital-analog converter 130 which converts the digital signals output by the counter 120 to analog signals. A frequency measurement circuit consisting of the counter 120, the reference oscillator 140 and the reference pulse generator 150 performs the function of measuring the oscillation frequency of the oscillation circuit 110 which varies following according to the displacement of the detection rod 7. The digital output of this frequency measurement circuit is converted to an analog signal in terms of voltage by means of the digital-analog converter 130. A variation of the output of this converter 130 is proportional to a displacement of the spill-ring, which is further proportional to a variation in the flow quantity of fuel.

Figure 5:
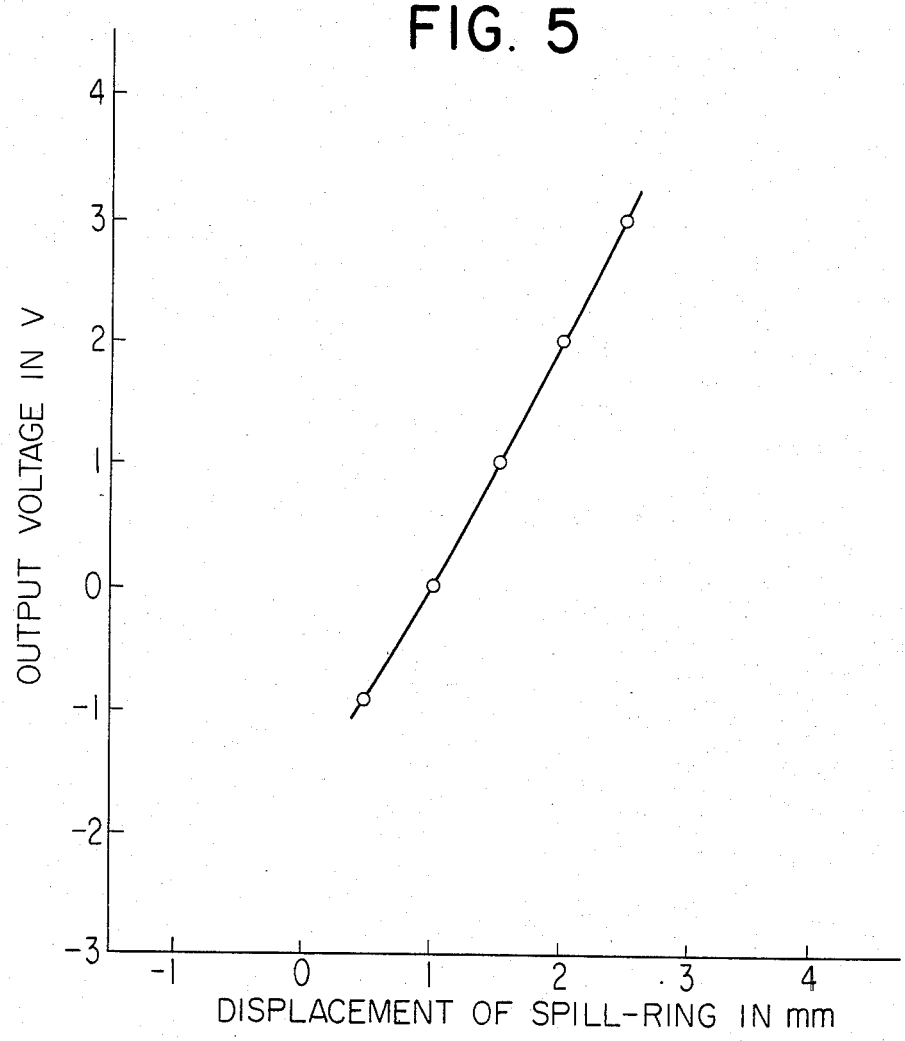
FIG. 5 is a graph showing the output voltage vs. displacement of a spill-ring characteristics of a sensor shown in FIG. 3 with a circuit shown in FIG. 4.

FIG. 5 shows an exemplary characterisitic of a sensor for detecting flow quantity of fuel comprising the sensor shown in FIG. 3 and the circuit shown in FIG. 4. The graph shows its excellent characteristics including a high sensitivity and good, linearity without hysteresis characteristics.

Figure 6:
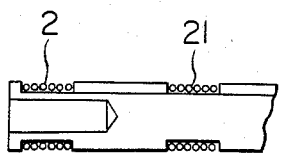
FIG. 6 is a cross sectional view of a portion of a bobbin which is provided with a dummy coil for temperature compensation in addition to a coil for detecting the spill-ring displacement.
Figure 8:
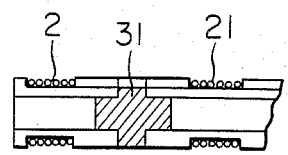
FIG. 8 is a cross sectional view of a portion of a bobbin which is provided with a spacer inserted between the two coils for the purpose to prevent undesirable magnetic interference between the two coils.
Figure 7:
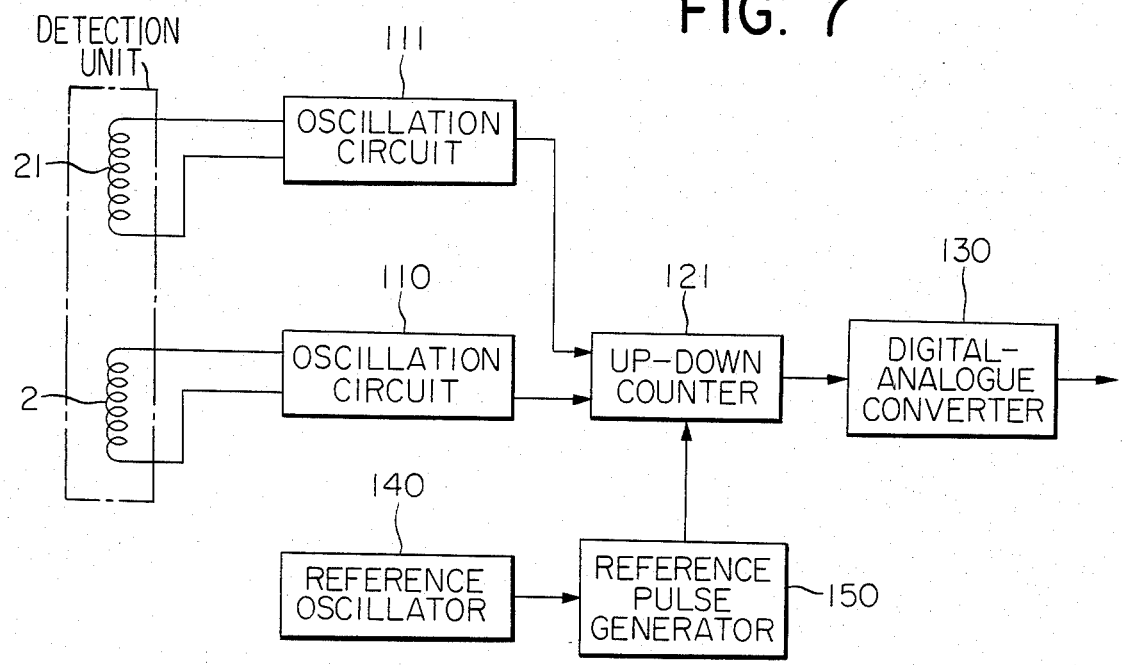
FIG. 7 is a block-diagram of a circuit which is connected with a sensor for detecting the flow quantity of fuel shown in FIG. 6 or 8.

Particularly from the viewpoint that a sensor is mounted on an automobile, it is clear that special consideration must be paid to the temperature characteristics of the sensor. Since the inductance of the coil 2 varies with the temperature change, there is a possibility that results of measurement differ depending on the temperature under which a measurement is carried out. Therefore, it be desired that such a sensor is provided with means for prevention or removal of such errors as are caused by temperature variation. FIG. 6 shows one example of a means which achieves the foregoing desire. Referring to the figure, the coil bobbin 3 is provided with the dummy coil 21 which has a function to compensating the effects to variation in temperature and which is arranged close to the coil 2 which measures the displacement of a spill-ring. FIG. 7 shows the block diagram of an example of a circuit which operates together with the detection unit shown in FIG. 6 provided with the temperature compensation coil or the dummy coil 21. The differences between this circuit (shown in FIG. 7) and the circuit shown in FIG. 4 are that this circuit is additionally provided with an oscillation circuit 111 which is connected to the dummy coil 21 and that an up-down counter 121 rather than the counter 120 is provided with. The function of the temperature compensation is based on an idea that (a) the up-down counter 121 counts up in response to the output of the oscillation circuit 110, (b) the up-down counter 121 counts down in response to the output of the oscillation circuit 111, and (c) thereby the effects of temperature variation is offset.

However, it has been made clear that a potential mutual influence between the coil 2 for detection of the displacement of a spill-ring and the dummy coil 21 for temperature compensation causes an adverse effect for the detection characteristics of the displacement, provided those two coils 2 and 21 shown in FIG. 6 are located close to each other. This drawback can be removed by application of magnetic shield to separate each coil. In other words, the foregoing adverse effect for the detection characteristics of the displacement due to the magnetic interference which occurs between the two coils 2 and 21 can be effectively prevented from occurring even in the case where each the coils 2 and 21 are located close to each other, if both coils are separated by a magnetic shield a spacer 31 produced of a non-magnetic conductive material e.g. an aluminum alloy.

Figure 9:
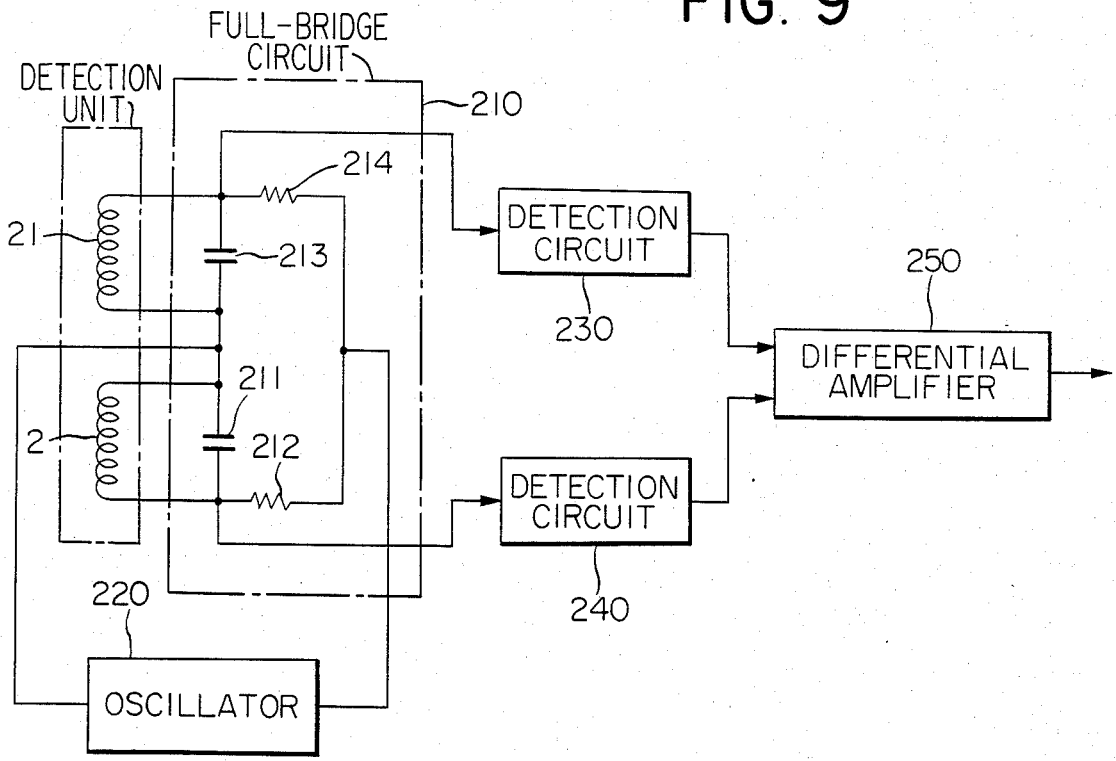
FIG. 9 is a block-diagram of another circuit employing full-bridge circuit, which is connected with a sensor for detecting the flow quantity of fuel shown in FIG. 8.

In the case where the foregoing magnetic shield is insufficient for preventing magnetic coupling of those two coils 2 and 21, because those two coils are too closely located, a bridge voltage system which will be described below with reference to FIG. 9, is effective. A circuit following the bridge voltage system comprises (a) a full-bridge circuit 210 including a parallel connection of the coil 2 for detecting the displacement of a detection member and a condenser 211, a parallel connection of the coil 21 for temperature compensation and a condenser 213, and resistances 212 and 214, (b) an oscillator 220 for applying an alternating current with approximately 1 (MHz) to this full-bridge circuit, (c) detection circuits 230 and 240 for detecting an ac voltage which appears at an end of the bridge and (d) a differential amplifier 250 for amplifying the difference of the outputs of the two detection circuits. A variation in inductance of a coil corresponding to a displacement of the detection rod is detected as a voltage variation appearing at the end of the bridge circuit. In this circuit, variations in inductance of coils following the temperature variation and components of connection caused by the mutual induction M between two coils are offset. As a result, such influences are eliminated from the output. Since the output of this bridge circuit contains also the resistance component of coils, the detection is made in the form of a variation in impedance.

When the coil bobbin is made from a material having a low thermal expansion coefficient (e.g. ceramics), the effects due to the thermal expansion of the coil bobbin can be reduced, resulting in a further improvement in thermal stability.

Although the foregoing description has been made with reference to a rod-shaped detection member, the shape of the detection member is not limited thereto. In other words, the detection member may be in the form of a plate, and it may be formed as one body with a spill-ring.

The foregoing description has clarified that a sensor for detecting the flow quantity of fuel according to the present invention exhibits high sensitivity, excellent linearity, and improved reliability and durability because it has no sliding and/or contact component or components. Further, since the sensor is small and of an embedded type, it does not increase the dimension of a pump in which this sensor is provided. Furthermore, temperature compensation can be made by providing another coil in addition to a coil for the displacement detection. This sensor is entirely satisfactory as a sensor for detecting flow quantity of fuel supplied to a fuel injection system for an engine of an automobile, because it is simple in construction, high in reliability, easy to produce, and less expensive.

Although the present invention has been described with reference to a specific embodiment, this description is not meant to be construed in a limiting sense. Various modifications of the described embodiments, as well as other embodiments of this invention, will become apparent to persons skilled in the art upon reference to the description of the present invention. It is therefore contemplated that the appended claims will cover any such modifications or embodiments as fall within the true scope of this invention.

What is claimed is:

1. A sensor for detecting the flow quantity of fuel supplied to a fuel injection system having a spill-ring, said sensor comprising:

a detection member comprising a rod member fixed to the spill-ring of the fuel injection system for movement in axial direction thereof in response to movement of the spill-ring, a coil assembly comprising a bobbin including a cylindrical member having a hollow end portion with an axial hole therein facing said detection rod member, said rod member being inserted in said axial hole without contacting the inner wall of said axial hole, first coil means for detecting displacement of said rod member as a variation in inductance of said coil means, said first coil means being wound around said hollow end portion of said bobbin, and second coil means for detecting variation of temperature as a function of variation in inductance of said second means, said second coil means being wound around said bobbin adjacent said first coil means with a predetermined spacing therebetween, said first coil means being closer to said detection rod member than is said second coil means, whereby displacement of said rod member is detected in response to the movement of the spill-ring as a variation in inductance by said coil assembly to provide a measure of the flow quantity of fuel with temperature compensation, a pump-fixing member comprising a hollow cylindrical body threadably connected to said bobbin, said hollow cylindrical body having an outer surface and including external threads for adjustable attachment to an external body to adjustably fix the relative relation between the reference position of the spill-ring and the sensor, a seal on said outer surface of said cylindrical body, and an output terminal secured to said pump-fixing member at an end thereof, and a lead wire connected to said first coil means and said terminal and passing through a groove provided in an external surface of said coil bobbin, a penetration hole provided in said pump-fixing member at the other end thereof and an internal hollow space provided in said pump-fixing member.

2. A sensor as claimed in claim 1 further comprising a spacer of non-magnetic, conductive material disposed between said first and second coil means to decrease mutual interference between said first and second coil means.

3. A sensor as claimed in claim 1 wherein said bobbin is made of a material having a low thermal expansion coefficient.

4. A sensor as claimed in claim 1 wherein said bobbin is made of ceramic.

5. A sensor for detecting the flow quantity of fuel supplied to a fuel injection system having a spill-ring, said sensor comprising:

a detection member comprising a rod member fixed to the spill-ring of the fuel injection system for movement in axial direction thereof in response to movement of the spill-ring, a coil assembly comprising a bobbin including a cylindrical member having a hollow end portion with an axial hole therein facing said detection rod member, said rod member being inserted in said axial hole without contacting the inner wall of said axial hole, first coil means for detecting displacement of said rod member as a variation in inductance of said coil means, said first coil means being wound around said hollow end portion of said bobbin, second coil means for detecting variation of temperature as a function of variation in inductance of said second coil means, said second coil means being wound around said bobbin adjacent said first coil means with a predetermined spacing therebetween, said first coil means being closer to said detection rod member, whereby displacement of said rod member is detected in response to the movement of the spill-ring as a variation in inductance by said coil assembly to provide a measure of the flow quantity of fuel with temperature compensation, a first oscillation circuit for receiving a signal from said first coil means for detecting the displacement of said spill-ring and for varying the oscillation frequency thereof in response to a variation in inductance of said first coil means, a second oscillation circuit for receiving a signal from said second coil means for temperature compensation and for varying the oscillation frequency thereof in response to a variation in inductance of said second coil means, and circuit means for calculating the difference between the outputs of said first and second oscillation circuits and providing an output signal proportional to the flow quantity of fuel.

6. A sensor as claimed in claim 5 wherein said circuit means comprises an up-down counter connected to said first and second oscillation circuits for counting up by the output of said first oscillation circuit and for counting down by the output of said second oscillation circuit, a reference oscillator for producing a reference signal, and a reference pulse generator connected to said reference oscillator and said up-down counter for generating a reference pulse.

7. A sensor for detecting the flow quantity of fuel supplied to a fuel injection system having a spill-ring, said sensor comprising:

a detection member comprising a rod member fixed to the spill-ring of the fuel injection system for movement in axial direction thereof in response to movement of the spill-ring, a coil assembly comprising a bobbin including a cylindrical member having a hollow end portion with an axial hole therein facing said detection rod member, said rod member being inserted in said axial hole without contacting the inner wall of said axial hole, first coil means for detecting displacement of said rod member as a variation in inductance of said coil means, said first coil means being wound around said hollow end portion of said bobbin, second coil means for detecting variation of temperature as a function of variation in inductance of said second coil means, said second coil means being wound around said bobbin adjacent said first coil means with a predetermined spacing therebetween, said first coil means being closer to said detection rod member, whereby displacement of said rod member is detected in response to the movement of the spill-ring as a variation in inductance by said coil asssmbly to provide a measure of the flow quantity of fuel with temperature compensation, a full-bridge circuit comprising (i) first to fourth terminals, (ii) a first parallel circuit consisting of said first coil means and a first condenser, said first parallel circuit being connected between said first and second terminals, (iii) a second parallel circuit consisting of said second coil means and a second condenser, said second parallel circuit being connected between said second and third terminals, (iv) a first resistor connected between said third and fourth terminals and (v) a second resistor connected between said fourth and first terminals, an alternating current power supply source connected between said second and fourth terminals, a first detector circuit connected to said first terminal, a second detector circuit connected to said third terminal, and a differential amplifier circuit which amplifies the difference of the outputs of said first and second detectors.

* * * * *